(12) United States Patent  
Solomon

(10) Patent No.: US 12,377,701 B2
(45) Date of Patent: Aug. 5, 2025

(54) SYSTEM AND METHOD FOR ESTIMATING LATERAL ACCELERATION

(71) Applicant: ClearMotion, Inc., Billerica, MA (US)

(72) Inventor: Nicholas James Solomon, Leamington Spa (GB)

(73) Assignee: ClearMotion, Inc., Billerica, MA (US)

( * ) Notice: Subject to any disclaimer, the term of this patent is extended or adjusted under 35 U.S.C. 154(b) by 68 days.

(21) Appl. No.: 17/925,039

(22) PCT Filed: May 13, 2021

(86) PCT No.: PCT/US2021/032291
§ 371 (c)(1),
(2) Date: Nov. 14, 2022

(87) PCT Pub. No.: WO2021/231758
PCT Pub. Date: Nov. 18, 2021

(65) Prior Publication Data
US 2023/0182523 A1    Jun. 15, 2023

Related U.S. Application Data

(60) Provisional application No. 63/025,578, filed on May 15, 2020.

(51) Int. Cl.
*B60G 17/018*    (2006.01)
*B60G 17/019*    (2006.01)

(52) U.S. Cl.
CPC ... *B60G 17/0182* (2013.01); *B60G 17/01908* (2013.01); *B60G 2400/104* (2013.01)

(58) Field of Classification Search
CPC ............ B60G 17/0182; B60G 17/0198; B60G 2400/104; B60G 17/018
USPC .......................................................... 701/37
See application file for complete search history.

(56) References Cited

U.S. PATENT DOCUMENTS

| | | | | |
|---|---|---|---|---|
| 3,866,706 A | * | 2/1975 | Lincke | B62D 6/04 180/446 |
| 5,088,762 A | * | 2/1992 | Fukuyama | B60G 17/0162 280/5.506 |
| 7,774,103 B2 | * | 8/2010 | Deng | B60T 8/172 701/1 |
| 7,957,877 B2 | * | 6/2011 | Makiyama | B60G 17/018 701/72 |

(Continued)

FOREIGN PATENT DOCUMENTS

GB    2574257 A    12/2019
WO    WO 2019/167264 A1    9/2019

OTHER PUBLICATIONS

International Search Report and Written Opinion mailed Aug. 23, 2021 for International Application No. PCT/US2021/032291.

(Continued)

*Primary Examiner* — Andrew Joseph Rudy
(74) *Attorney, Agent, or Firm* — Wolf, Greenfield & Sacks, P.C.

(57) ABSTRACT

Methods are provided for controlling various systems in a vehicle based on input signals from at least one physical sensor and at least one model of a vehicle or a portion of the vehicle. The controller may rely preferentially on one or the other inputs based on the frequency of a motion of the vehicle and the state of the vehicle or one or more portions of the vehicle.

24 Claims, 6 Drawing Sheets

(56) References Cited

U.S. PATENT DOCUMENTS 8,050,838 B2 * 11/2011 Ryu .................. B60W 40/103
 701/79
2008/0086251 A1 4/2008 Lu et al.

OTHER PUBLICATIONS

International Preliminary Report on Patentability mailed Nov. 15, 2022 for International Application No. PCT/US2021/032291.

* cited by examiner

SYSTEM AND METHOD FOR ESTIMATING LATERAL ACCELERATION

RELATED APPLICATIONS

Related Applications

This application is a national stage filing under 35 U.S. C. § 371 of International Patent Application Serial No. PCT/US2021/032291, filed May 13, 2021, which claims the benefit of priority under 35 U.S.C. § 119 (e) to U.S. Provisional Application Ser. No. 63/025,578, filed on May 15, 2020, the contents of each of which is herein incorporated by reference in its entirety.

BACKGROUND

A system such as a vehicle may include various subsystems that are controlled by microprocessor-based controllers that rely on sensor measurements. However, the output signals from such sensors may be adversely affected by the motion that is being measured. This may result in poor performance and/or unstable operation.

BRIEF SUMMARY

According to one aspect, this disclosure discusses a method for estimating a lateral acceleration of a vehicle, that includes obtaining a measurement, with a sensor (e.g., an accelerometer, an IMU) configured to sense the lateral acceleration of the vehicle or a portion of the vehicle, generating a first signal based on the measurement, also computing the lateral acceleration of the vehicle with a model, generating a second signal based on the computed lateral acceleration, generating an error signal based on the difference between the first signal and the second signal, filtering the error signal with a filter (e.g. low pass filter), estimating the lateral acceleration based on the sum of the filtered error signal and the second signal. In some embodiments the cutoff frequency of the filter is adjust based on an operating parameter of the vehicle (e.g., steering rate, steering angle, amount of driver counter steering, or timing of driver counter steering). In some embodiments model may be a bicycle model. In some embodiments the cutoff frequency of the low pass filter is increased with increasing steering rate.

According to one aspect, this disclosure discusses a method for operating a system of a vehicle that includes: estimating a lateral acceleration of the vehicle, where in a first operating mode, the estimate is based primarily on a measurement with a sensor on-board the vehicle, and in a second operating mode, the lateral acceleration estimate is based primarily on a mathematical model of the vehicle; and operating the system of the vehicle at least partially based on the lateral acceleration estimate. In some embodiments the mathematical model is a bicycle model and the system is an active suspension system.

According to one aspect, this disclosure discusses a method for operating a system in a vehicle undergoing lateral acceleration, that includes: producing a first signal representative of the lateral acceleration with a sensor that is sensitive to the lateral acceleration; producing a second signal representative of the lateral acceleration using a mathematical model of the vehicle; producing an error signal based on the difference between the first signal and the second signal; filtering the error and adding the result to the second signal to produce an estimate of the lateral acceleration; and operating the system at least partially based on the estimate.

According to one aspect, this disclosure discusses a method of operating a microprocessor-based controller of a system in a moving vehicle, that includes: determining a first value of a motion parameter with a sensor on-board the vehicle; determining a second value of the motion parameter with a model of at least a portion of the vehicle; determining a difference between the first value and the second value; and based at least partially on the difference, determining an estimated value of a motion parameter. In some embodiments the motion parameter may be a lateral acceleration of the vehicle. In some embodiments the method further includes filtering the difference with a filter, where the estimated value of the motion parameter is also at least partially based on the filtered difference. In some embodiments a value of a filter parameter is based on a value of an operating parameter of the vehicle (e.g., steering rate, steering angle, amount of driver counter steering, or timing of driver counter steering). In some embodiments the filter may be a low pass filter where the filter parameter is the cutoff frequency. In some embodiments the system may be, for example, a fully active suspension system, a semi-active suspension system, an active roll-control system, or a stability control system. In some embodiments the vehicle may be, for example, a car, a truck, a van, or a bus.

DETAILED DESCRIPTION

Figure 1:
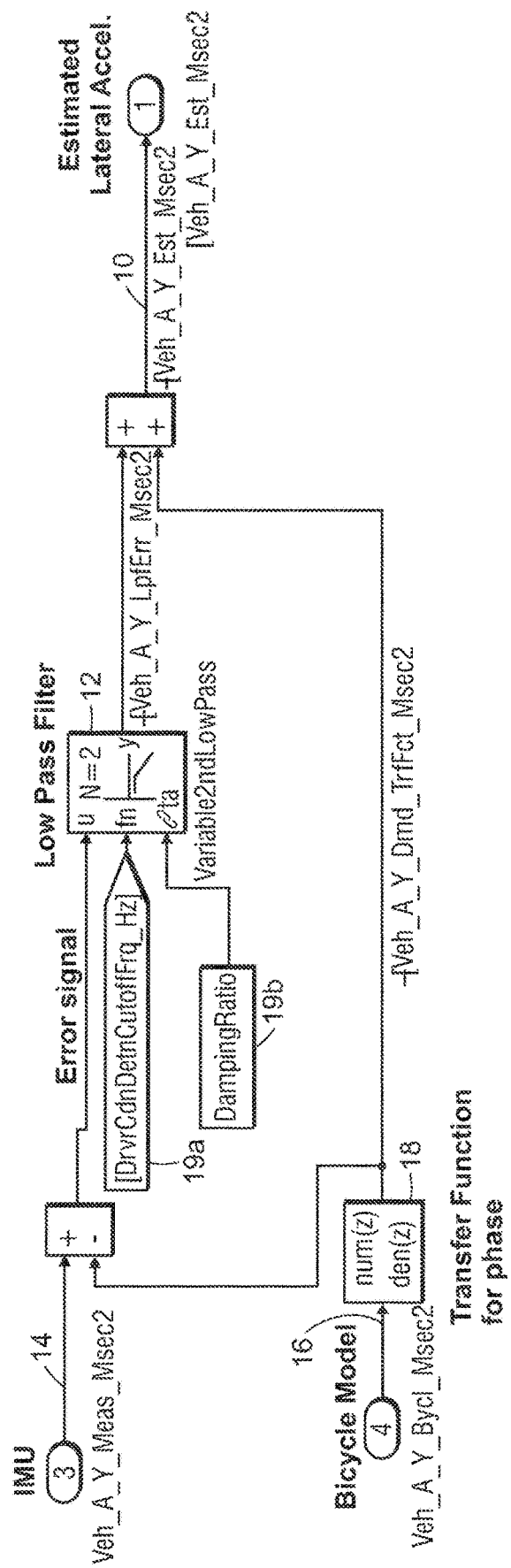
FIG. 1: Sensor fusion of measured lateral acceleration from the IMU and a bicycle model estimate using a second order low pass filter.

In some embodiments, a microprocessor-based controller may be used to control a system (e.g., a fully active suspension system, a semi-active suspension system, an active roll-control system, or a stability control system) of a vehicle (e.g., a car, a truck, a van, or a bus). An input signal to such a controller may include, for example, an estimate of the magnitude of a vehicle motion parameter (e.g., lateral acceleration of a vehicle). In some embodiments, the estimate of the magnitude of the motion parameter may be based on the difference between a measured value of the parameter and a value determined by using a model of the vehicle or a portion of the vehicle. In some embodiments this difference may be filtered by a filter (e.g., low pass filtered) where at least one parameter of the filter (e.g., the cutoff frequency of a low pass filter) is determined based a vehicle operating parameter (e.g., steering rate, steering angle and/or amount and/or timing of driver counter steering.

For example, in some embodiments, a lateral acceleration estimate may be used in controlling various vehicle systems, such as for example, an active suspension control system, an active-roll control system, or a stability control system. In some embodiments, vehicle control systems may include at least two measures of vehicle lateral acceleration. One measure may be a measurement obtained from one or more sensors (e.g., an inertial measurement unit (IMU), an appropriately positioned single axis accelerometer, and/or a appropriately positioned multi-axis accelerometer) affixed to the vehicle. A second measure may be an estimate from a model (e.g. a vehicle bicycle model, or a mathematical simulation of the vehicle). In some embodiments, a sensor measurement may be sufficient for controlling one or more vehicular systems, (e.g., an active suspension system) under certain driving situations or operating modes. Such driving situations may include, for example, transient maneuvers, such as: step steers and lane changes, driving on banked bends where there are additional force reactions due to gravity, and high lateral acceleration maneuvers. A sensor measurement such as for example, an IMU signal, may be acceptable as an input to the control system under certain driving situations, because the IMU measurement may effectively represent the forces acting on the vehicle body or accelerations of the vehicle body.

However, in some embodiments, for example sensors used for measuring lateral acceleration, such as for example an IMU, may also be sensitive to, for example, one or more components of roll acceleration (for example because, the sensor may be mounted at a distance from the effective or instantaneous roll axis of the vehicle). In some embodiments, lateral acceleration signal from a sensor, e.g., an IMU, located at a distance from the roll center of the vehicle, may therefore be inaccurate under some operating conditions or modes due to the effect of, for example, roll acceleration. In some embodiments, this inaccuracy may cause an unstable feedback loop in a controller in situations where, for example, there is significant primary roll content in the road surface.

Under certain conditions, a model, such as for example, a linear bicycle model or an equivalent model, may be used to estimate the vehicle lateral acceleration based on various quantities, such as for example, vehicle speed, steering angle, understeer gradient, and wheel base. However, in certain embodiments, models such as the linear bicycle model, which may not account for roll acceleration, may not be used to accurately estimate lateral acceleration under certain transient and high lateral acceleration conditions. Under such conditions, the non-linear behavior of the vehicle and the dynamics of the vehicle's motion may not be accurately represented by, for example, the simple bicycle model. Additionally, the models may not include the effect of gravity when driving on banked bends. Generally, models such as the bicycle model may include certain error states, but are effectively immune to the IMU's error state for roll acceleration. In effect such models may not be susceptible to roll acceleration.

In some embodiments, a controller may predict vehicle lateral acceleration ($A_y$) by performing a frequency-based error calculation, for example, using a lateral acceleration sensor, such as an IMU measurement, and a model, for example a bicycle model, estimate. The control mechanism may filter out the high frequency content of the measured $A_y$ when steering rates are low and hence remove the roll acceleration feedback from the $A_y$ estimate.

As shown in FIG. 1, in some embodiments, an estimated lateral acceleration 10 of a vehicle may be determined by filtering, with low pass filter 12, the error between measured acceleration 14 ($A_y$, (Veh_A_Y_Meas_Msec2) 14 at the sensor, e.g. the IMU, and the model, e.g. the bicycle model (Veh_A_Y_Bycl_Msec2) 16 and adding the error to the bicycle model. A $2^{nd}$ order transfer function (num(z)/den(z)) 18 may be applied to the bicycle model before the error calculation. This is a low pass filter that may add phase delay to the bicycle model to improve phasing with the IMU measurement. The phase mismatch between the bicycle model and the IMU may be due to the phase lead inherent in the bicycle model as it may be based on steering input and does not account for delays due to the roll inertia of the vehicle body.

The inventor has recognized that the cutoff frequency of the low pass filter 12 may be determined and tuned depending on driving conditions or operating parameter to allow for more accurate lateral acceleration prediction. As shown in FIG. 1, in some embodiments only the low frequency portion of the error between the IMU signal and the bicycle model may be added to the bicycle model estimate. This allows the system to capture steady state differences between the IMU signal and the bicycle model, which may occur, for example, when driving on a banked curve, where a gravity component (which may be important to know for one or more vehicle control systems or protocols) should be included for purposes of calculating lateral acceleration.

In some embodiments, the cutoff frequency of the low pass filter may be increased with steering rate. The resultant estimate tracks the bicycle model plus the low frequency error when steering rates are low and tracks the measured $A_y$ by the IMU when steering rates are high.

In some embodiments, in high lateral acceleration conditions, the bicycle model estimate may be error prone and may overpredict lateral acceleration in saturation situations, for example, step steer situations. For example, the bicycle model may continue to predict increasing lateral acceleration as steering increases, but the increasing lateral acceleration may not be occurring due to tire saturation.

In some embodiments, the low pass filter 12 may be, for example, a second order filter and the includes two tuning parameters 19a and 19b.

Figure 2:
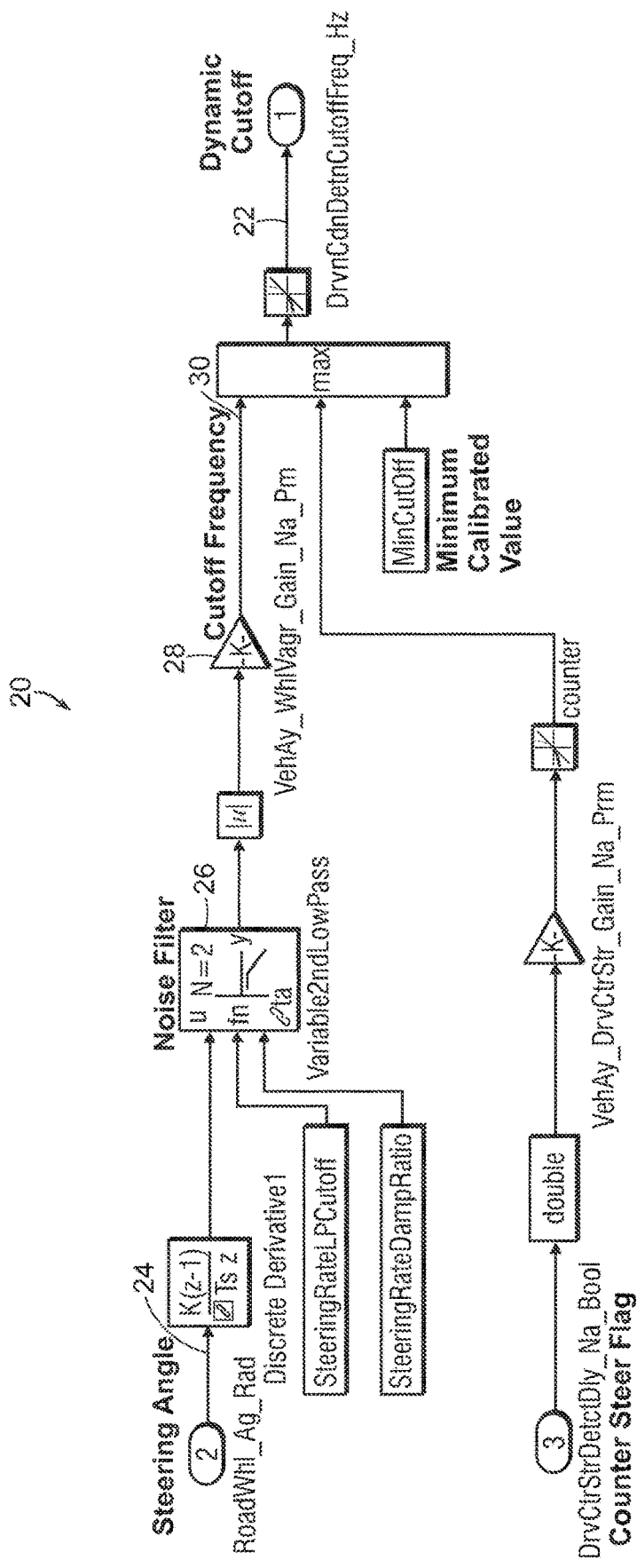
FIG. 2: Estimation of low pass filter cutoff frequency from steering angle and driver counter steer detection. Steering angle is differentiated and low pass filtered to give a low noise steering rate estimate.

FIG. 2 illustrates any exemplary system 20 for determining the dynamic cutoff frequency 22 for low pass filter 12 shown in FIG. 1 based on signal from various sensor-based measurements such as for example, steering angle and/or amount and/or timing of driver counter steer.

In some embodiments, the steering rate of the vehicle may be estimated by differentiating the steering angle 24. A filter 26 may be applied to reduce high frequency noise and then a gain 28 may be applied to the absolute value to give a resultant cut-off frequency 30 that increases with steering rate. This cut-off frequency may be applied to Filter 12 in FIG. 1.

Figure 4:
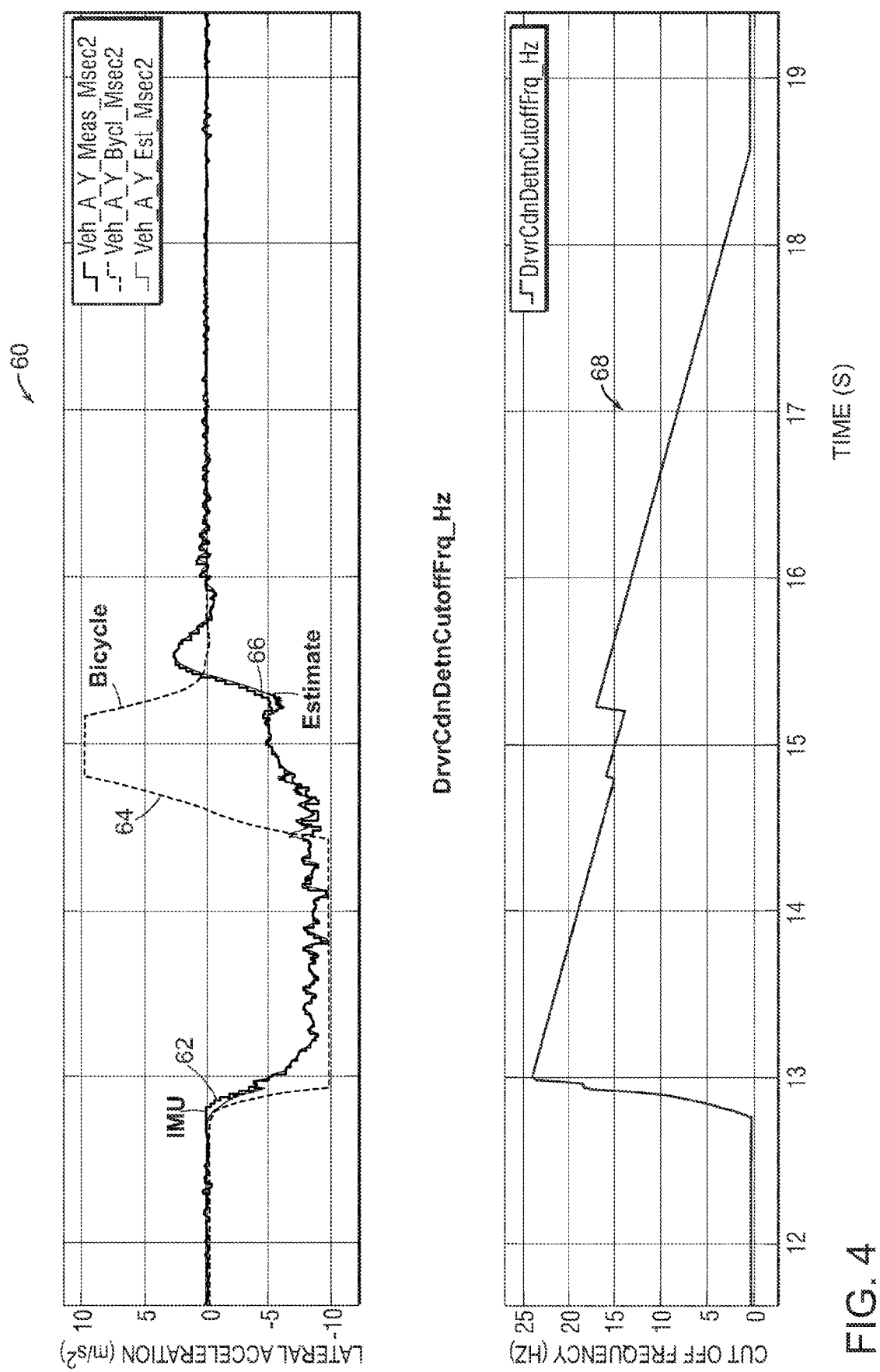
FIG. 4: Combined lateral acceleration estimate (Veh_A_Y_Msec2) from the IMU measurement (Veh_A_Y_Meas_Msec2) and the bicycle model (Veh_A_Y_Bycl_Msec2) during a step steer driving maneuver.

Additionally, in some embodiments, an external 'driver counter steer detection' flag may be used to further increase the cut-off frequency. This is a Boolean flag that is set to true when the driver counter steers (steers in the opposite direction of the vehicle's $A_y$) to correct the vehicle during oversteer. In this situation, the direction of the bicycle model's lateral acceleration estimate may be wrong as the bicycle model may track the steering angle. During counter steer driving situations, the system may further increase the cutoff frequency of the low pass filter 12 to ensure that the lateral acceleration estimate tracks or more closely tracks the IMU signal rather than the bicycle model. An example of this driving condition is shown in FIG. 4.

Finally, the steering rate and driver counter steer detection derived cut-off frequencies may be compared to a minimum calibrated value and the maximum value may be selected. Hence, when the steering rate is low (e.g., below 200 steering wheel degrees or less) and counter steer is not detected (i.e., the counter steer flag may not be triggered), the cut-off frequency may be equal to the minimum calibrated value, which may be tuned within a range, nominally less than 0.5 Hz. However, low steering rate limits above this range are also contemplated, as the disclosure is not so limited.

Inventor has recognized that in some embodiments, under certain operating conditions, the slew rate of the dynamic cutoff frequency 22 may be rate limited while under other conditions it may not be limited.

For example, in some embodiments, a rate limit may be applied to the falling slew rate of the final dynamic cut-off frequency. This may be used to maintain a high cut-off frequency for a period (e.g., 2-3 seconds) after for example, transient, high steering rate events where dynamics and non-linearities may still be present. However, periods both above and below this range are also contemplated, as the disclosure is not so limited.

The inventor has also recognized that a rising slew rate may not be rate limited as it may be preferred that the lateral acceleration estimate react quickly to high steering rate inputs, such as for example, step steers. In some embodiments, rate limiting the rising slew rate may cause errors in transient estimation as it may take too long to rise and allow the estimate to tend towards the IMU estimate. In some embodiments, it may be desirable that the estimate rapidly tend towards the IMU reading during, for example, steep steers, due to the inherent transient inaccuracy of the bicycle model. In some embodiments, the estimate may tend towards the IMU reading in 20 to 100 milliseconds. In some embodiments, the estimate may tend towards the IMU reading in 20 to 50 milliseconds. However, the estimate may tend towards the IMU reading at rates both above or below the rates indicated above as the disclosure is not so limited.

Figure 3:
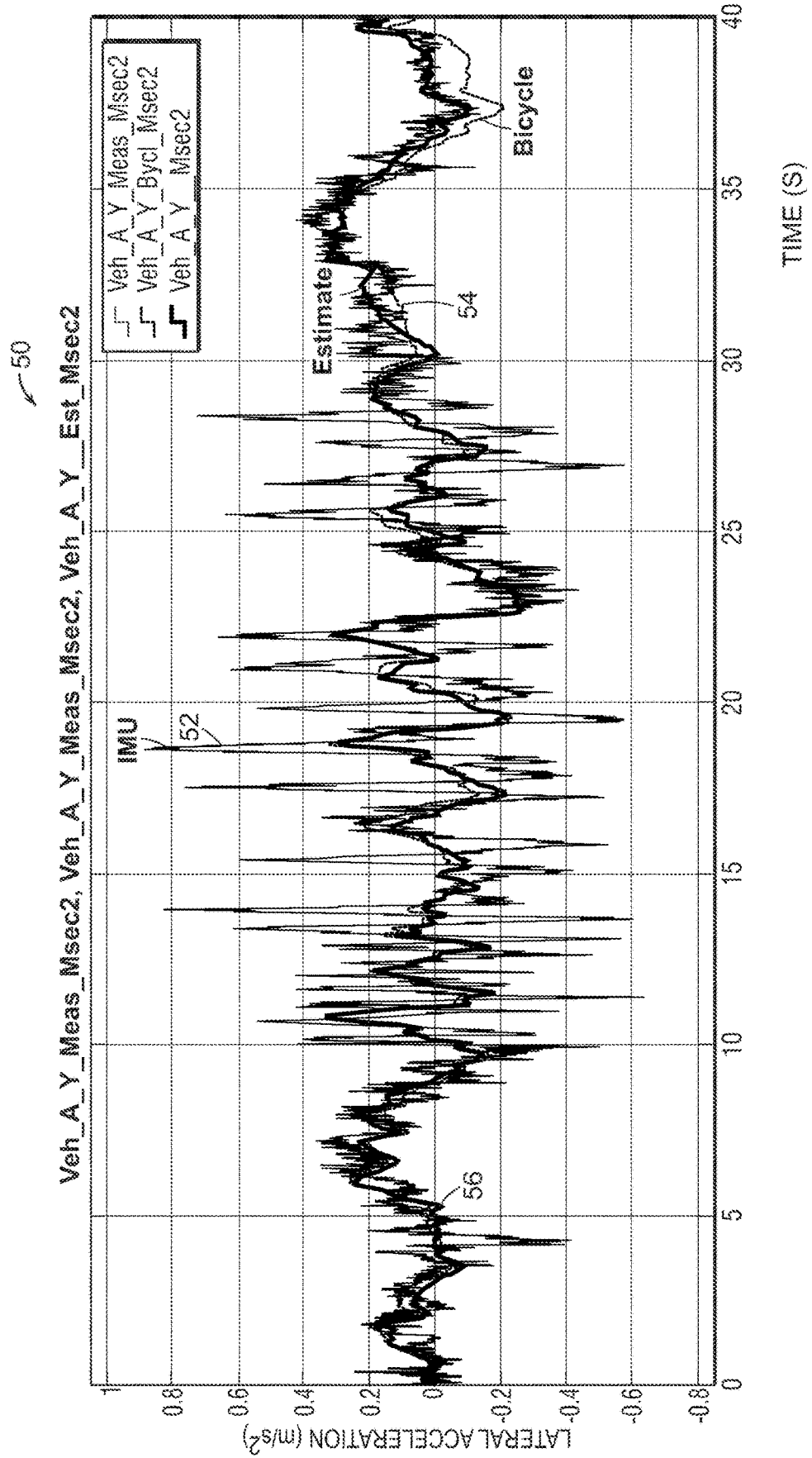
FIG. 3: Combined lateral acceleration estimate (Veh_A_Y_Msec2) from the IMU measurement (Veh_A_Y_Meas_Msec2) and the bicycle model (Veh_A_Y_Bycl_Msec2) when driving on a road with large amplitude primary roll content.

FIGS. 3-4 illustrate the output of the IMU, the bicycle model, and the estimate as determined by the system illustrated in FIGS. 1-2 under various exemplary operating conditions.

FIG. 3 illustrates an exemplary plot 50 showing lateral acceleration differences in IMU measurement 52, bicycle model prediction 54, and the resulting lateral acceleration estimate 56 while traveling in a vehicle over a road with large primary roll content. High frequency roll acceleration feedback can be seen in the IMU measurement 52, but this feedback does not make it through the low pass filter (as discussed above in connection with FIG. 1) as the steering rates, and therefore the set cut-off frequencies, are low. Accordingly, the lateral acceleration estimate tracks the bicycle model.

The upper graph 60 in FIG. 4 illustrates three exemplary plots of lateral acceleration showing differences in IMU measurement 62, bicycle model prediction 64, and the resulting lateral acceleration estimate 66 for a step steer in a vehicle traveling at 40 mph. The bottom plot 68 in FIG. 4 shows the cut-off frequency of the low pass filter as a function of time over the same time period. As shown, the cut-off frequency increases during the first steering input (at approximately 13 seconds) and so the estimate tracks the IMU signal. The bicycle model is in an error state during this step steer driving condition due to poor transient estimation. As can be seen, at approximately 15 seconds, the bicycle model predicts the wrong sign of lateral acceleration during the counter steer portion of the step steer.

Figure 5:
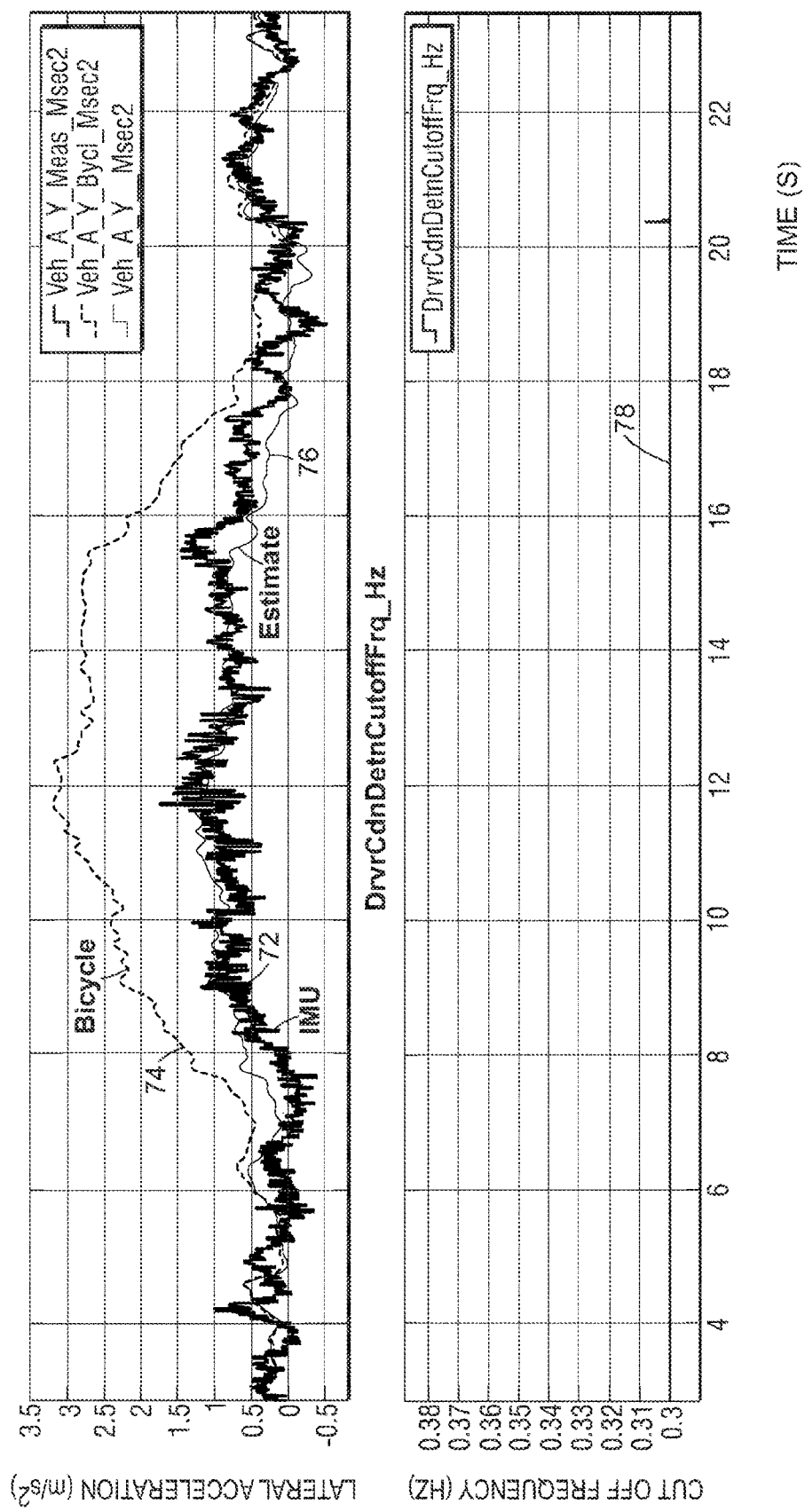
FIG. 5: Combined lateral acceleration estimate (Veh_A_Y_Msec2) from the IMU measurement (Veh_A_Y_Meas_Msec2) and the bicycle model (Veh_A_Y_Bycl_Msec2) when driving on a 33-degree banked bend.

The upper graph 70 of FIG. 5 illustrates three exemplary plots of lateral acceleration showing differences in IMU measurement 72, bicycle model prediction 74, and the resulting lateral acceleration estimate 76 while traveling over a road with a banked turn. The driving maneuver is a 33 degrees banked turn taken at near the neutral speed. At the neutral speed, the centripetal force and the lateral component of the normal force reaction due to gravity may effectively be equal and opposite and so the resultant lateral acceleration on the vehicle body is effectively zero. Although steering rates and therefore the cut-off frequency 78 of the low pass filter is low (0.3 Hz in this example), as shown in the lower graph of FIG. 5, the offset in the measured lateral acceleration due to gravity is low frequency and makes it through the low pass filter. Therefore, the final lateral acceleration estimate tracks the bicycle model plus the low frequency error between the bicycle model and the measured lateral acceleration at the IMU.

Figure 6:
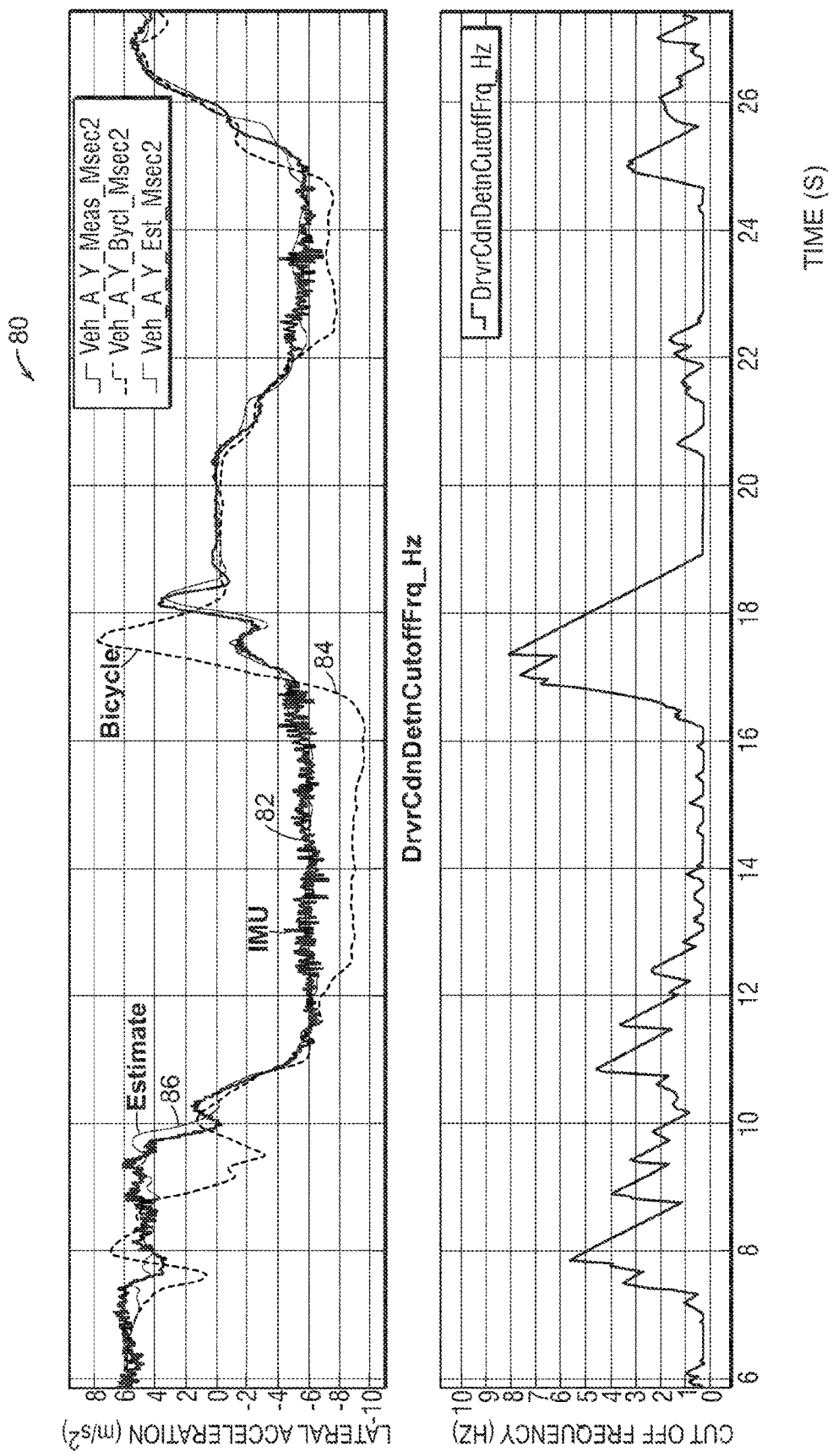
FIG. 6: Combined lateral acceleration estimate (Veh_A_Y_Msec2) from the IMU measurement (Veh_A_Y_Meas_Msec2) and the bicycle model (Veh_A_Y_Bycl_Msec2) when driving on a wet handling track.

The upper graph 80 of FIG. 6 illustrates three exemplary upper plots of lateral acceleration showing differences in IMU measurement 82, bicycle model prediction 84, and the resulting lateral acceleration estimate 86 while traversing a wet track in a vehicle. In this example, during the wet handling track lap, the bicycle model over-estimates during understeer (at approximately 12-16 seconds) and predicts the wrong sign during oversteer due to the driver's counter-steering (at approximately 17 seconds). During the understeer, the estimate tracks the IMU as the over estimation of the bicycle model is a low frequency offset and makes it through the low pass filter. The bottom plot in FIG. 6 shows the cut-off frequency of the low pass filter as a function of time over the same time period.

In some embodiments, during the oversteer, the steering rates increase due to the driver's corrective steer and the estimate again follows the IMU. For example, during an oversteer event, the driver may correct the steering quickly with a high steering rate. This high steering rate may drive up the cutoff frequency and the estimate would initially track the IMU measurement. In some embodiments, this behavior may be desirable since a model, such as the bicycle model, may be in error if it is based on steering, which may have the wrong sign due to the driver's counter-steer during the oversteer event.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

The invention claimed is:

1. A method for estimating a lateral acceleration of a vehicle, the method comprising:
   generating a first signal based on a measurement from a sensor at time T;
   computing the lateral acceleration of the vehicle with a model at the time T;
   generating a second signal based on the computation at the time T;
   generating an error signal based on a difference between the first signal and the second signal at the time T;
   filtering the error signal to generate a filtered signal; and
   estimating the lateral acceleration based on a sum of the filtered signal and the second signal.

2. The method of claim 1, wherein the filtering is performed with a low pass filter that has a cutoff frequency.

3. The method of claim 1, wherein the sensor is selected from the group consisting of an accelerometer and an IMU.

4. The method of claim 2, further comprising adjusting the cutoff frequency based on an operating parameter of the vehicle.

5. The method as in claim 4, wherein the operating parameter is selected from the group consisting of steering rate, steering angle, amount of driver counter steering, and timing of driver counter steering.

6. The method of claim 1, wherein the model is a bicycle model.

7. The method of claim 2, wherein the cutoff frequency of the low pass filter is increased with increasing steering rate.

8. A method for operating a system of a vehicle, the method comprising:
   estimating a lateral acceleration of the vehicle, wherein in a first operating mode, the estimate of the lateral acceleration is based primarily on a measurement with a sensor on the vehicle, and wherein in a second operating mode, the estimate of the lateral acceleration is based primarily on a mathematical model of the vehicle; and
   operating the system of the vehicle at least partially based on the estimate of the lateral acceleration;
   wherein in the first operating mode and the second operating mode the estimating is based at least partially on a filtered signal using a low-pass filter.

9. The method of claim 8, wherein the mathematical model is a bicycle model.

10. The method of claim 8, wherein the system is an active suspension system.

11. A method for operating a system in a vehicle undergoing lateral acceleration, the method comprising:
    producing a first signal representative of the lateral acceleration with a sensor that is sensitive to the lateral acceleration;
    producing a second signal representative of the lateral acceleration using a mathematical model of the vehicle;
    producing an error signal based on a difference between the first signal and the second signal;
    filtering, using a low-pass filter, the error signal to produce a filtered error signal and adding the filtered error signal to the second signal to produce an estimate of the lateral acceleration; and
    operating the system at least partially based on the estimate.

12. The method of claim 11 wherein the low-pass filter has a cutoff frequency.

13. The method of claim 11, wherein the system is selected from the group consisting of a fully active suspension system, a semi-active suspension system, an active roll-control system, or a stability control system.

14. The method of claim 11, wherein the mathematical model is a bicycle model.

15. The method of claim 12, further comprising varying the cutoff frequency of the low-pass filter as a function of at least one vehicle operating parameter.

16. The method of claim 15, wherein the at least one vehicle operating parameter is selected from the group consisting of steering rate, steering angle, amount of driver counter steering, and timing of driver counter steering.

17. The method of claim 11, wherein operating the system includes providing the estimate to a microprocessor-based controller configured to operate the system.

18. A method of operating a microprocessor-based controller of a system in a moving vehicle, the method comprising:
    determining a first value of a motion parameter with a sensor on-board the moving vehicle;
    determining a second value of the motion parameter with a model of at least a portion of the moving vehicle;
    determining a difference between the first value and the second value;
    filtering the difference using a low-pass filter; and
    based at least partially on the filtered difference, determining an estimated value of a motion parameter.

19. The method of claim 18, wherein the motion parameter is a lateral acceleration of the moving vehicle.

20. The method of claim 18, wherein the system is selected from the group consisting of a fully active suspension system, a semi-active suspension system, an active roll-control system, and a stability control system.

21. The method of claim 18, further comprising setting a value of a filter parameter based on a value of an operating parameter of the moving vehicle.

22. The method of claim 21, wherein the operating parameter of the moving vehicle is selected from the group consisting of steering rate, steering angle, amount of driver counter steering, and timing of driver counter steering.

23. The method of claim 18, wherein the moving vehicle is selected from the group consisting of a car, a truck, a van, and a bus.

24. The method of claim 21, wherein the filter parameter is a cutoff frequency of a low pass filter.

* * * * *